(12) United States Patent
Kim et al.

(10) Patent No.: US 12,197,690 B2
(45) Date of Patent: Jan. 14, 2025

(54) DISPLAY DEVICE AND METHOD OF MANUFACTURING THE SAME

(71) Applicant: Samsung Display Co., Ltd., Yongin-si (KR)

(72) Inventors: Youngdo Kim, Yongin-si (KR); Sunghoon Kim, Yongin-si (KR); Sungguk An, Yongin-si (KR); Soojung Lee, Yongin-si (KR); Chulho Jeong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/522,594

(22) Filed: Nov. 29, 2023

(65) Prior Publication Data

US 2024/0256097 A1   Aug. 1, 2024

(30) Foreign Application Priority Data

Jan. 30, 2023   (KR) .................. 10-2023-0011863

(51) Int. Cl.
*G06F 3/045* (2006.01)
*G06F 3/046* (2006.01)

(52) U.S. Cl.
CPC .... *G06F 3/046* (2013.01); *G06F 2203/04102* (2013.01); *G06F 2203/04103* (2013.01)

(58) Field of Classification Search
CPC .............. G09F 9/301; G06F 3/046; G06F 2203/04102; G06F 2203/04103
See application file for complete search history.

(56) References Cited

U.S. PATENT DOCUMENTS

| 9,990,085 B2 | 6/2018 | Kobayashi |
| 10,372,279 B2 | 8/2019 | Yoon et al. |

(Continued)

FOREIGN PATENT DOCUMENTS

| JP | 6144422 B2 | 5/2017 |
| KR | 102275889 B1 | 7/2021 |

(Continued)

OTHER PUBLICATIONS

MDPI [online]; [retrieved on Aug. 9, 2019]; retrieved from the Internet www.mdpi.com/journal/sensors; Han et al., "Multifunctional Flexible Sensor Based on Laser-Induced Graphene" Sensors 2019, 19, 3477; doi: 10.3390/s19163477; published online Aug. 9, 2019.

(Continued)

*Primary Examiner* — Joe H Cheng
(74) *Attorney, Agent, or Firm* — CANTOR COLBURN LLP

(57) ABSTRACT

A display device including a display area and a foldable area includes a digitizer, and a display panel arranged on the digitizer, wherein the digitizer includes a first digitizer layer, and a second digitizer layer arranged on the first digitizer layer to be in contact with the first digitizer layer, and wherein the first digitizer layer includes a first layer including a polyimide material, and a plurality of first wires arranged on the first layer to be directed in a first direction and including a graphene material, and the second digitizer layer includes a second layer including a polyimide material, and a plurality of second wires arranged on the second layer to be directed in a second direction crossing the first direction and including a graphene material.

20 Claims, 12 Drawing Sheets

(56) References Cited

U.S. PATENT DOCUMENTS

| | | | |
|---|---|---|---|
| 11,283,157 B2 | 3/2022 | Baik et al. | |
| 11,853,119 B2* | 12/2023 | Yoo | G06F 1/1656 |
| 2009/0107736 A1* | 4/2009 | Ben-Eliyahu | G06F 3/0446 |
| | | | 178/18.01 |
| 2022/0086267 A1 | 3/2022 | Shin et al. | |
| 2022/0129094 A1* | 4/2022 | Tatsuno | G06F 3/04162 |
| 2022/0147170 A1* | 5/2022 | Park | H10K 59/40 |
| 2022/0187979 A1* | 6/2022 | Jung | G06F 3/04166 |
| 2023/0084467 A1* | 3/2023 | Gu | G06F 1/1616 |
| | | | 361/679.01 |
| 2023/0145495 A1* | 5/2023 | Cho | H10K 71/00 |
| | | | 257/40 |
| 2023/0259244 A1* | 8/2023 | Kobori | G06F 3/046 |
| | | | 345/173 |
| 2024/0160329 A1* | 5/2024 | Na | G06F 1/1652 |

FOREIGN PATENT DOCUMENTS

| | | |
|---|---|---|
| KR | 20210150942 A | 12/2021 |
| KR | 20220037007 A | 3/2022 |
| KR | 20220066033 A | 5/2022 |

OTHER PUBLICATIONS

Nanjing Tech University [online]; [retrieved on Apr. 7, 2022]; retrieved from the Internet www.nature.com/npjflexelectron; Wang et al., "A soft and Stretchable Electronics Using Laser-Induced Graphene on Polyimide/PDMS Composite Substrate" npj Flexible Electronics (2022) 26; published online Apr. 7, 2022.

* cited by examiner

DISPLAY DEVICE AND METHOD OF MANUFACTURING THE SAME

This application claims priority to Korean Patent Application No. 10-2023-0011863, filed on Jan. 30, 2023, and all the benefits accruing therefrom under 35 U.S.C. § 119, the content of which in its entirety is herein incorporated by reference.

BACKGROUND

1. Field

One or more embodiments relate to a display device, and more particularly, to a display device having a foldable area and a method of manufacturing the same.

2. Description of the Related Art

Mobile electronic devices have been widely used. In addition to small electronic devices, such as mobile phones, tablet personal computers (PCs) have recently been widely used as mobile electronic devices.

In order to support various functions, such a mobile electronic device includes a display device for providing a user with visual information, such as images or video. Recently, as other parts for driving the display device have become smaller, the proportion occupied by display devices in electronic devices has been gradually increasing, and a structure capable of being bent in a flat state to have a certain angle has also been developed.

SUMMARY

One or more embodiments include a display device including a foldable area having an excellent restoring force and a simple manufacturing process.

However, this technical problem is only an example, and technical problems to be solved by one or more embodiments are not limited thereto.

Additional embodiments will be set forth in part in the description which follows and, in part, will be apparent from the description, or may be learned by practice of the presented embodiments.

According to one or more embodiments, a display device including a display area and a foldable area includes a digitizer, and a display panel arranged on the digitizer, wherein the digitizer includes a first digitizer layer, and a second digitizer layer arranged on the first digitizer layer to be in contact with the first digitizer layer, and wherein the first digitizer layer includes a first layer including a polyimide material, and a plurality of first wires arranged on the first layer to be directed in a first direction and including a graphene material, and the second digitizer layer includes a second layer including a polyimide material, and a plurality of second wires arranged on the second layer to be directed in a second direction crossing the first direction and including a graphene material.

In an embodiment the display area may include a first display area and a second display area spaced apart from each other with the foldable area therebetween, wherein the digitizer may include a first digitizer portion corresponding to the first display area, a second digitizer portion corresponding to the second display area, and a third digitizer portion corresponding to the foldable area.

In an embodiment the first digitizer portion, the second digitizer portion, and the third digitizer portion may be integrally provided with one another.

In an embodiment the display device may further include a first plate arranged under the digitizer.

In an embodiment the first plate may include a metal material.

In an embodiment the third digitizer portion may include a third-1 digitizer portion integrally provided with the first digitizer portion, and a third-2 digitizer portion spaced apart from the third-1 digitizer portion and integrally provided with the second digitizer portion.

In an embodiment the display device may further include a first plate arranged between the digitizer and the display panel.

In an embodiment the first plate may include a first-1 plate portion corresponding to the first display area and including a non-metallic material, a first-2 plate portion corresponding to the second display area and including a non-metallic material, and a first-3 plate portion corresponding to the foldable area and including a metal material.

In an embodiment the digitizer may further include a third digitizer layer arranged on the second digitizer layer to be in contact with the second digitizer layer, wherein the third digitizer layer may include a third layer including a polyimide material, and a plurality of third wires arranged on the third layer to be directed in the first direction and including a graphene material.

In an embodiment the digitizer may further include a fourth digitizer layer arranged on the third digitizer layer to be in contact with the third digitizer layer, wherein the fourth digitizer layer may include a fourth layer including a polyimide material, and a plurality of fourth wires arranged on the fourth layer to be directed in the second direction and including a graphene material.

According to one or more embodiments, a method of manufacturing a display device including a display area and a foldable area includes arranging a digitizer, and arranging a display panel on the digitizer, wherein the arranging of the digitizer includes arranging a first digitizer layer, and arranging a second digitizer layer on the first digitizer layer to be in contact with the first digitizer layer, and wherein the arranging of the first digitizer layer includes forming a plurality of first wires to be directed in a first direction and including a graphene material by emitting a laser beam onto a first layer including a polyimide material, and the arranging of the second digitizer layer includes forming a plurality of second wires to be directed in a second direction crossing the first direction and including a graphene material by emitting a laser beam onto a second layer including a polyimide material.

In an embodiment the display area may include a first display area and a second display area spaced apart from each other with the foldable area therebetween, wherein the digitizer may include a first digitizer portion corresponding to the first display area, a second digitizer portion corresponding to the second display area, and a third digitizer portion corresponding to the foldable area.

In an embodiment the first digitizer portion, the second digitizer portion, and the third digitizer portion may be integrally provided with one another.

In an embodiment the method may further include arranging a first plate under the digitizer.

The first plate may include a metal material in an embodiment.

In an embodiment the third digitizer portion may include a third-1 digitizer portion integrally provided with the first digitizer portion, and a third-2 digitizer portion apart from the third-1 digitizer portion and integrally provided with the second digitizer portion.

In an embodiment the method may further include arranging a first plate between the digitizer and the display panel.

In an embodiment the first plate may include a first-1 plate portion corresponding to the first display area and including a non-metallic material, a first-2 plate portion corresponding to the second display area and including a non-metallic material, and a first-3 plate portion corresponding to the foldable area and including a metal material.

In an embodiment the arranging of the digitizer may further include arranging a third digitizer layer on the second digitizer layer to be in contact with the second digitizer layer, wherein the arranging of the third digitizer layer may include forming a plurality of third wires to be directed in the first direction and including a graphene material by emitting a laser beam onto a third layer including a polyimide material.

In an embodiment the arranging of the digitizer may further include arranging a fourth digitizer layer on the third digitizer layer to be in contact with the third digitizer layer, wherein the arranging of the fourth digitizer layer may include forming a plurality of fourth wires to be directed in the second direction and including a graphene material by emitting a laser beam onto a fourth layer including a polyimide material.

BRIEF DESCRIPTION OF THE DRAWINGS

The above and other aspects, features, and advantages of embodiments will be more apparent from the following description taken in conjunction with the accompanying drawings, in which.

DETAILED DESCRIPTION

Figure 1:
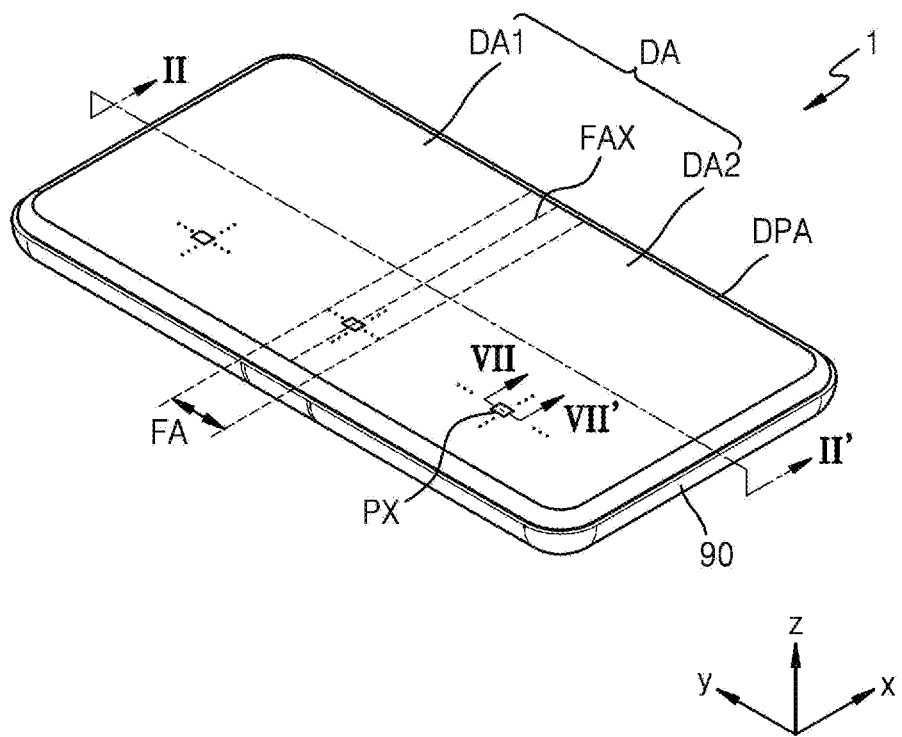
FIG. 1 is a perspective view of a display device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the description allows for various changes and numerous embodiments, certain embodiments will be illustrated in the drawings and described in the written description. Effects and features of one or more embodiments and methods of accomplishing the same will become apparent from the following detailed description of the one or more embodiments, taken in conjunction with the accompanying drawings. However, the embodiments may have different forms and should not be construed as being limited to the descriptions set forth herein.

One or more embodiments will be described below in more detail with reference to the accompanying drawings. Those elements that are the same or are in correspondence with each other are rendered the same reference numeral regardless of the figure number, and redundant descriptions thereof are omitted.

It will be understood that when an element is referred to as being related to another element such as being "on" another element, it can be directly on the other element or intervening elements may be present therebetween. In contrast, when an element is referred to as being related to another element such as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be understood that the terms "include," "comprise," and "have" as used herein specify the presence of stated features or elements but do not preclude the addition of one or more other features or elements.

It will be further understood that, when a layer, region, or element is referred to as being on another layer, region, or element, it may be directly or indirectly on the other layer, region, or element. That is, for example, intervening layers, regions, or elements may be present.

Sizes of elements in the drawings may be exaggerated or reduced for convenience of explanation. For example, since sizes and thicknesses of elements in the drawings are arbitrarily illustrated for convenience of explanation, the following embodiments are not limited thereto.

The x-axis, the y-axis, and the z-axis are not limited to three axes of the rectangular coordinate system and may be interpreted in a broader sense. For example, the x-axis, the y-axis, and the z-axis may be perpendicular to one another or may represent different directions that are not perpendicular to one another.

When an embodiment may be implemented differently, a certain process order may be performed differently from the described order. For example, two consecutively described processes may be performed substantially at the same time or performed in an order opposite to the described order.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is a perspective view of a display device 1 according to an embodiment.

Referring to FIG. 1, in an embodiment, the display device 1 is a device displaying a moving image and/or a still image, and may be used as the display screen of not only portable electronic devices, such as a mobile phone, a smartphone, a tablet personal computer (PC), a mobile communication terminal, an electronic notebook, an e-book, a portable multimedia player (PMP), a navigation system, and/or an ultra-mobile PC (UMPC), but also various products, such as a television, a notebook computer, a monitor, a billboard, and/or the Internet of things (IoT).

In an embodiment, the display device 1 may be used in wearable devices, such as a smartwatch, a watch phone, a glasses-type display, and/or a head-mounted display (HMD). In an embodiment, the display device 1 may be used as a car's instrument panel, a center information display (CID) placed on a car's center fascia or dashboard, a room mirror display replacing a car's side mirror, and/or a display placed on the back of a front seat as entertainment for a car's rear seat. FIG. 1 illustrates an embodiment of the display device 1 being used as a smartphone for convenience of description.

In an embodiment, the display device 1 may include a display area DA and a peripheral area DPA located outside the display area DA. In addition, the display device 1 may include a foldable area FA, and the display area DA may include a first display area DA1 and a second display area DA2 spaced apart from each other with the foldable area FA therebetween. The peripheral area DPA may be a non-display area in which display elements may not be arranged.

In an embodiment, the display area DA and the foldable area FA may display images individually and/or together. More specifically, pixels PX may be arranged in the display area DA and the foldable area FA. Accordingly, the display device 1 may provide an image by using the pixels PX arranged in the display area DA and the foldable area FA.

In the present description, terms, such as "on," "above," and "top," refer to the +z-axis direction with respect to the display device 1, and terms, such as "under," "below," and "bottom," refer to the −z-axis direction.

In an embodiment, the display device 1 may have a rectangular shape. For example, as shown in FIG. 1, the display device 1 may have a planar shape of a rectangle having a long side in a first direction (e.g., the y-axis direction) and a short side in a second direction (e.g., the x-axis direction). A corner at which the long side in the first direction (e.g., the y-axis direction) and the short side in the second direction (e.g., the x-axis direction) meet each other may be rounded to have a certain curvature or may be formed at a right angle. A planar shape of the display device 1 is not limited to a rectangular shape and may be any other shape, such as polygonal, elliptical, and/or atypical shapes.

The display device 1 described above may have various forms. In an embodiment, the display device 1 may have a shape that is not able to change. In an embodiment, the display device 1 may be at least partially foldable. In this case, the display device 1 may be of an in-folding type in which display areas DA face each other when the display device 1 is folded, or an out-folding type in which the display area DA is exposed to the outside when the display device 1 is folded. Hereinafter, a case where the display device 1 is of an in-folding type will be mainly described for convenience.

In an embodiment, in the above case, the display device 1 may be foldable around a foldable axis FAX. In this case, when the display device 1 is folded around the foldable axis FAX, a size of the display area DA may be reduced, and when the display device 1 is completely unfolded, the display area DA may display an image while forming a flat surface, thereby implementing a large screen.

Figure 2:
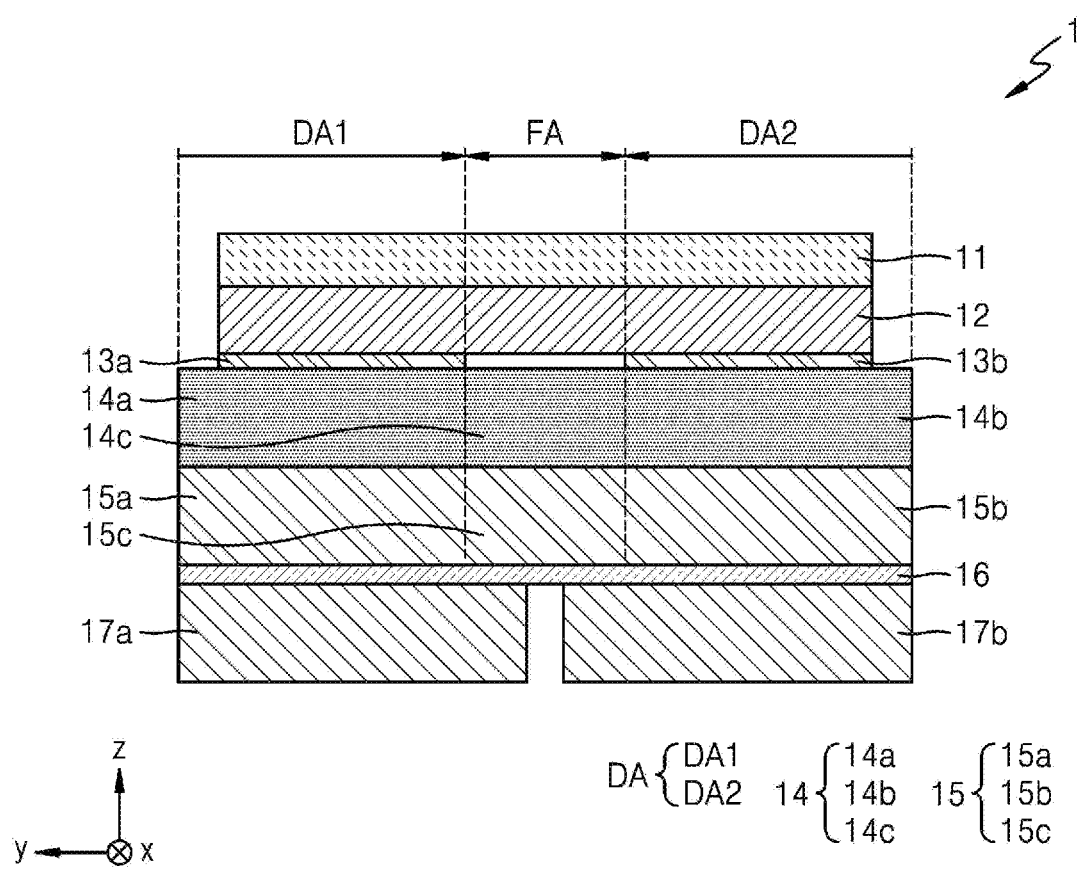
FIG. 2 is a cross-sectional view of a display device according to an embodiment.

FIG. 2 is a cross-sectional view of the display device 1 according to an embodiment. FIG. 2 may correspond to part II-II' of FIG. 1.

In an embodiment, the display device 1 may include a display panel 11, a panel protection member 12, adhesive layers 13a and 13b, a digitizer 14, a first plate 15, an elastic member 16, and second plates 17a and 17b.

In an embodiment, the display panel 11 may be a light-emitting display panel including a light-emitting element. For example, the display panel 11 may be an organic light-emitting display panel using an organic light-emitting diode including an organic emission layer, a micro light-emitting diode (LED) display panel using a micro LED, a quantum-dot light-emitting display panel using a quantum-dot light-emitting diode including a quantum-dot emission layer, and/or an inorganic light-emitting display panel using an inorganic light-emitting diode including an inorganic semiconductor.

In an embodiment, the display panel 11 may be a rigid display panel which is not easily bent due to rigidity, and/or a flexible display panel which is easily bent, folded, or rolled due to flexibility. For example, the display panel 11 may be a foldable display panel that may be folded and unfolded, a curved display panel in which a display surface is curved, a bent display panel in which an area other than a display surface is bent, a rollable display panel that may be rolled or spread, and/or a stretchable display panel.

In an embodiment, the display panel 11 may be a transparent display panel which is transparent such that an object or background arranged on a bottom surface of the display panel 11 may be viewed through a top surface of the display panel 11. In another embodiment, the display panel 11 may be a reflective display panel which may reflect an object or background on a top surface of the display panel 11.

In an embodiment, the panel protection member 12 may be disposed under the display panel 11. The panel protection member 12 may be attached to the bottom of the display panel 11 to support and/or protect the display panel 11. The panel protection member 12 may include polyethylene terephthalate (PET) and/or polyimide (PI).

In an embodiment, the digitizer 14 may be disposed below the display panel 11. That is, the panel protection member 12 and/or the display panel 11 may be disposed on the digitizer 14.

In an embodiment, the digitizer 14 may include a first digitizer portion 14a corresponding to the first display area DA1, a second digitizer portion 14b corresponding to the second display area DA2, and a third digitizer portion 14c corresponding to the foldable area FA.

In an embodiment, the first digitizer portion 14a may at least partially overlap the first display area DA1, the second digitizer portion 14b may at least partially overlap the second display area DA2, and the third digitizer portion 14c may at least partially overlap the foldable area FA. The first digitizer portion 14a, the second digitizer portion 14b, and/or the third digitizer portion 14c may be integrally provided with one another.

In an embodiment, the third digitizer portion 14c may include a folding structure. The folding structure of the third digitizer portion 14c may include a plurality of holes passing through the third digitizer portion 14c and/or a plurality of grooves recessed from one side of the third digitizer portion 14c. The plurality of holes and/or the plurality of grooves in the folding structure of the third digitizer portion 14c may be directed in a third direction (e.g., the z-axis direction). Due to the folding structure of the third digitizer portion 14c, the third digitizer portion 14c may be more easily folded.

In an embodiment, the adhesive layers 13a and 13b may be disposed between the panel protection member 12 and the digitizer 14. The adhesive layers 13a and 13b may be separate from each other with the foldable area FA therebetween. For example, the adhesive layers 13a and 13b may be pressure-sensitive adhesive (PSA).

In an embodiment, the first plate 15 may be disposed under the digitizer 14. The first plate 15 may include a first-1 plate portion 15a corresponding to the first display area DA1, a first-2 plate portion 15b corresponding to the second display area DA2, and a first-3 plate portion 15c corresponding to the foldable area FA.

In an embodiment, the first-1 plate portion 15a may at least partially overlap the first digitizer portion 14a, the first-2 plate portion 15b may at least partially overlap the second digitizer portion 14b, and/or the first-3 plate portion 15c may at least partially overlap the third digitizer portion 14c.

In an embodiment, the first-1 plate portion 15a, the first-2 plate portion 15b, and the first-3 plate portion 15c may be integrally provided with one another. The first-1 plate portion 15a, the first-2 plate portion 15b, and/or the first-3 plate portion 15c may include the same material as one another. The first plate 15 may include a metal material.

In an embodiment, the first-3 plate portion 15c may include a folding structure. The folding structure of the first-3 plate portion 15c may include a plurality of holes passing through the first-3 plate portion 15c and/or a plurality of grooves recessed from one side of the first-3 plate portion 15c. The plurality of holes and/or the plurality of grooves in the folding structure of the first-3 plate portion 15c may be directed in the third direction (e.g., the z-axis direction). Due to the folding structure of the first-3 plate portion 15c, the first-3 plate portion 15c may be more easily folded.

In an embodiment, the elastic member 16 may be disposed under the first plate 15. The elastic member 16 may include a thermoplastic polyurethane (TPU) material.

In an embodiment, the second plates 17a and 17b may be disposed under the elastic member 16. That is, the elastic member 16 and/or the first plate 15 may be disposed on the second plates 17a and 17b.

In an embodiment, the second plates 17a and 17b may be separate from each other around the foldable area FA. The second plates 17a and 17b may at least partially overlap the first display area DA1 and/or the second display area DA2. The second plates 17a and 17b may include a metal material. The second plates 17a and 17b may protect the display panel 11 by absorbing an external shock.

Figure 3A:
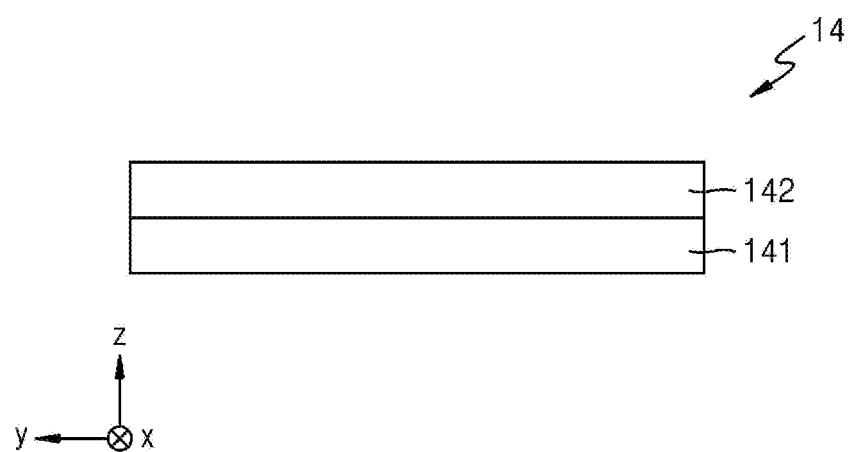
FIG. 3A is a cross-sectional view of a digitizer according to an embodiment.
Figure 3B:
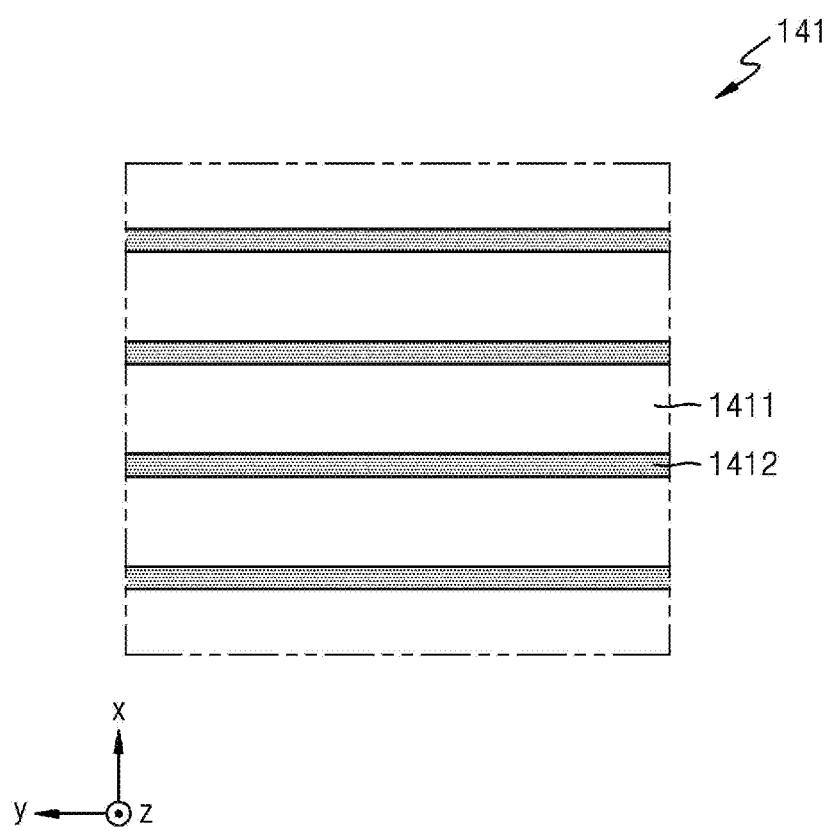
FIG. 3B is a plan view of a first digitizer layer according to an embodiment.
Figure 3C:
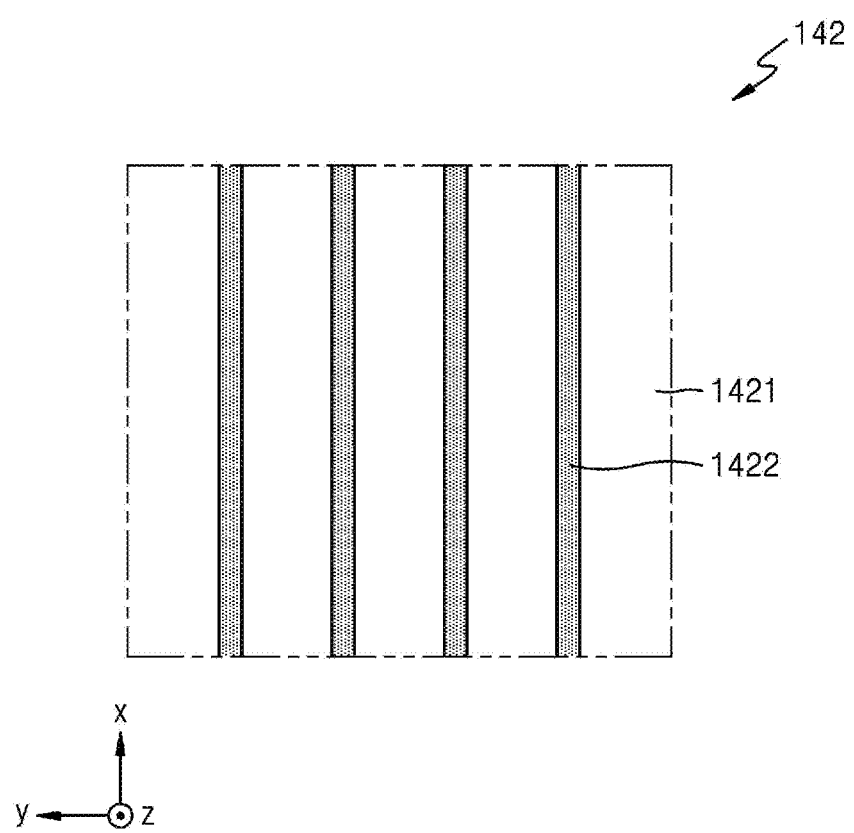
FIG. 3C is a plan view of a second digitizer layer according to an embodiment.

FIG. 3A is a cross-sectional view of the digitizer 14 according to an embodiment. FIG. 3B is a plan view of a first digitizer layer 141 according to an embodiment. FIG. 3C is a plan view of a second digitizer layer 142 according to an embodiment.

In an embodiment and referring to FIGS. 3A to 3C, the digitizer 14 may include the first digitizer layer 141 and the second digitizer layer 142. The second digitizer layer 142 may be disposed on the first digitizer layer 141 to be in contact with the first digitizer layer 141.

In an embodiment, the first digitizer layer 141 may include a first layer 1411 and a plurality of first wires 1412 disposed on the first layer 1411. The second digitizer layer 142 may include a second layer 1421 and a plurality of second wires 1422 disposed on the second layer 1421.

In an embodiment, the plurality of first wires 1412 and the plurality of second wires 1422 may be in the form of loop coils. When an electronic pen touches or hovers over a display device, an induced current may be generated, and thus, the plurality of first wires 1412 and/or the plurality of second wires 1422 may be used to determine a position of the electronic pen. The plurality of first wires 1412 may be directed in a first direction (e.g., the y-axis direction), and the plurality of second wires 1422 may be directed in a second direction (e.g., the x-axis direction) crossing the first direction (e.g., the y-axis direction). Because the plurality of first wires 1412 and the plurality of second wires 1422 cross each other, an exact position of the pen may be identified.

Figure 4:
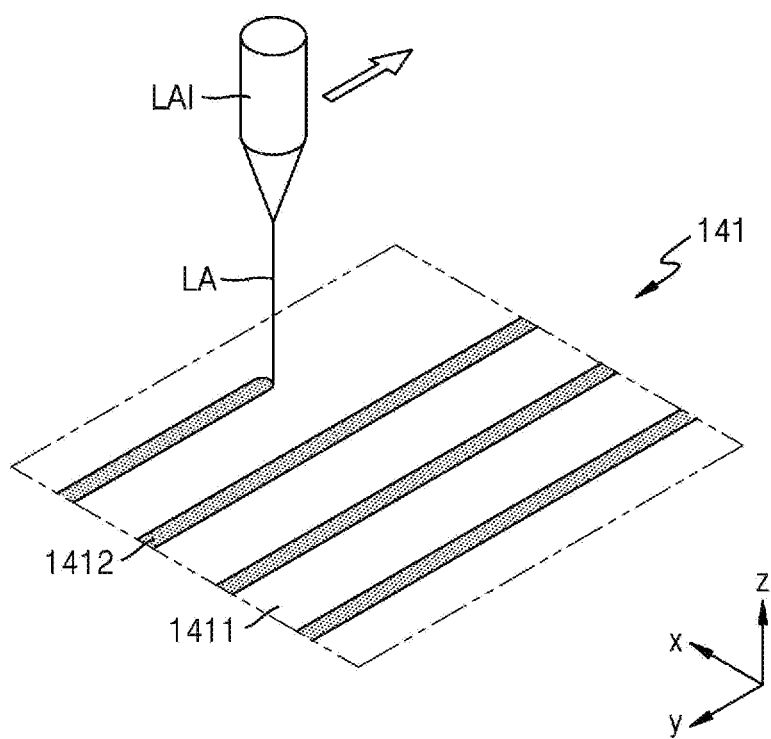
FIG. 4 is a perspective view illustrating a method of manufacturing a first digitizer layer, according to an embodiment.

FIG. 4 is a schematic perspective view for describing a method of manufacturing the first digitizer layer 141, according to an embodiment.

In an embodiment and referring to FIG. 4, the first digitizer layer 141 may be manufactured by a laser-induced graphene process.

In an embodiment, the first layer 1411 may include a polyimide material. A laser emitter LAI may emit a laser beam LA onto the first layer 1411. For example, the laser beam LA emitted by the laser emitter LAI may be a $CO_2$ infrared laser beam LA. A portion of the first layer 1411 irradiated with the laser beam LA may have the polyimide material converted into a graphene material, so that a first wire 1412 may be formed. That is, the first wire 1412 may include a graphene material. As the laser emitter LAI emits the laser beam LA while moving in a first direction (e.g., the y-axis direction), the first wire 1412 may be directed in the first direction (e.g., the y-axis direction).

In an embodiment, like the first digitizer layer 141, the second digitizer layer 142 may also be manufactured by a laser-induced graphene process. Accordingly, the second layer 1421 may include a polyimide material, and/or a second wire 1422 may include a graphene material.

Figure 5A:
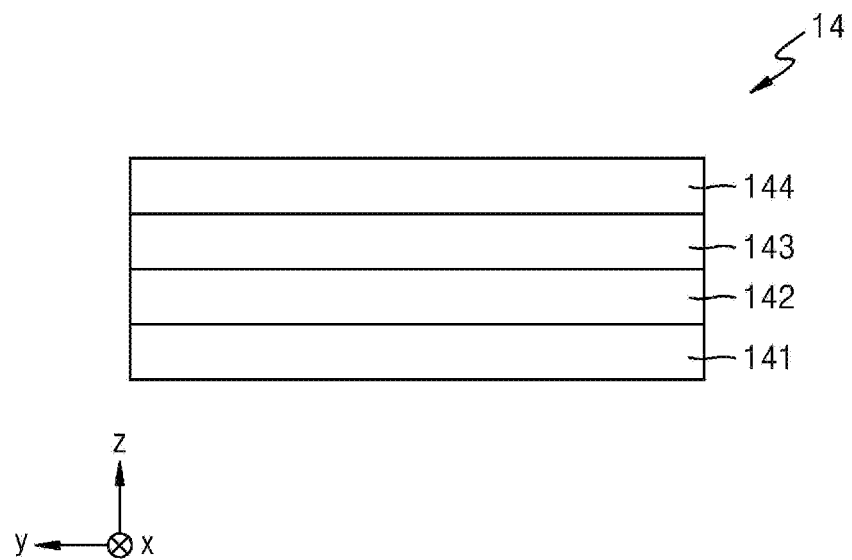
FIG. 5A is a cross-sectional view of a digitizer according to another embodiment.
Figure 5B:
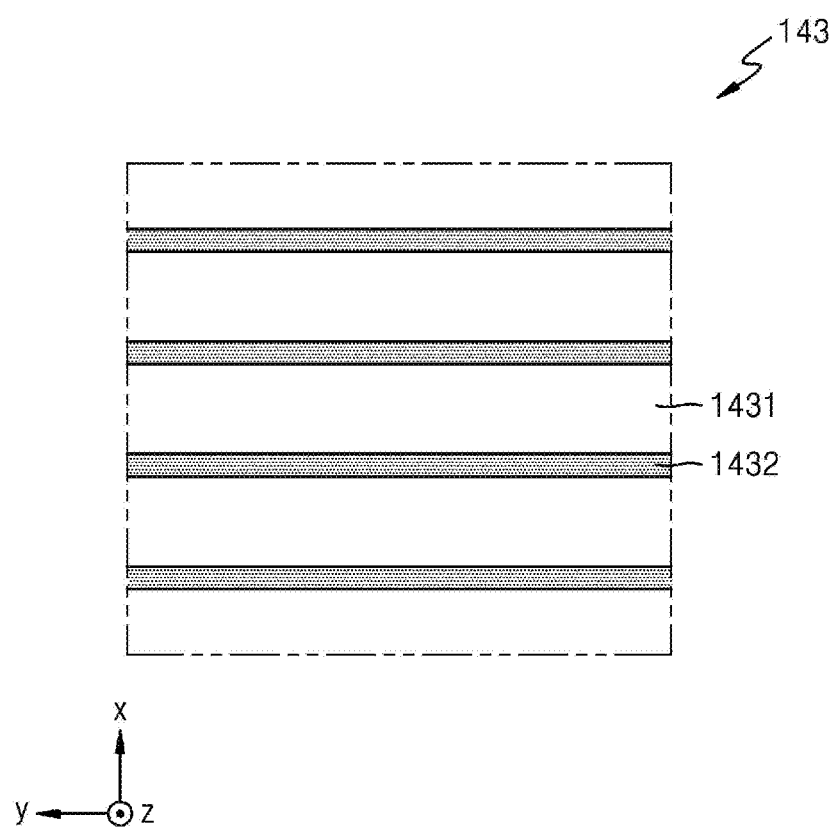
FIG. 5B is a plan view of a third digitizer layer according to another embodiment.
Figure 5C:
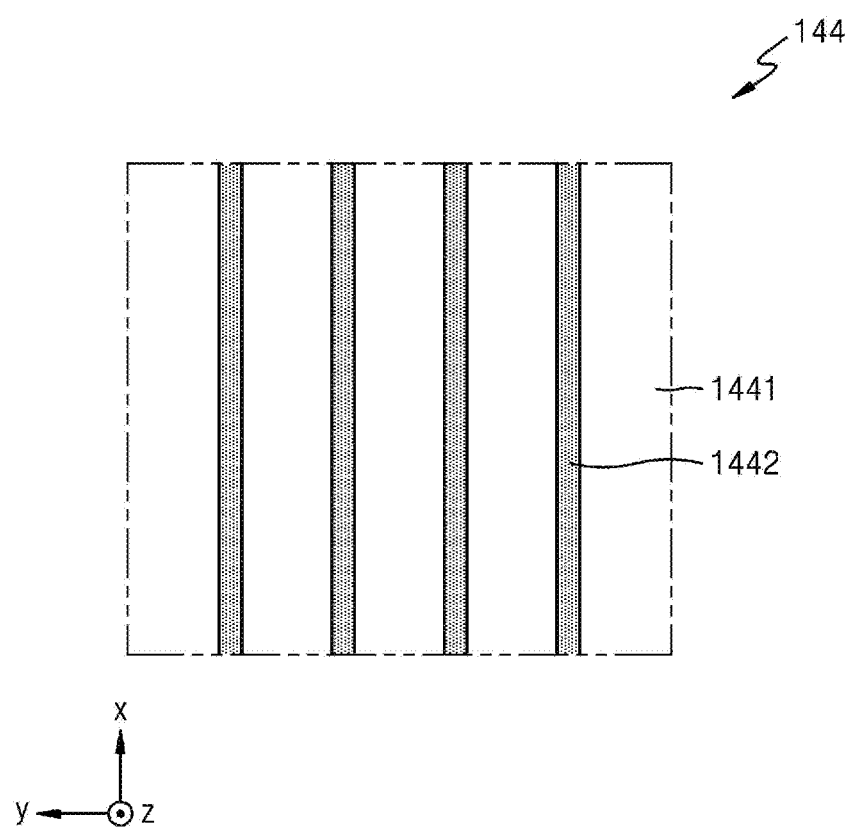
FIG. 5C is a plan view of a fourth digitizer layer according to another embodiment.

FIG. 5A is a cross-sectional view of the digitizer 14 according to another embodiment. FIG. 5B is a plan view of a third digitizer layer 143 according to another embodiment. FIG. 5C is a plan view of a fourth digitizer layer 144 according to another embodiment.

In FIGS. 5A to 5C, the same reference numerals as those in FIGS. 3A to 3C denote the same elements, and thus, a repeated description thereof is omitted below.

In an embodiment, referring to FIGS. 5A to 5C, the digitizer 14 may include the first digitizer layer 141, the second digitizer layer 142, the third digitizer layer 143, and/or the fourth digitizer layer 144.

In an embodiment, the third digitizer layer 143 may be disposed on the second digitizer layer 142 to be in contact with the second digitizer layer 142, and/or the fourth digitizer layer 144 may be disposed on the third digitizer layer 143 to be in contact with the third digitizer layer 143.

In an embodiment, the third digitizer layer 143 may include a third layer 1431 and a plurality of third wires 1432 disposed on the third layer 1431. The fourth digitizer layer 144 may include a fourth layer 1441 and a plurality of fourth wires 1442 disposed on the fourth layer 1441. The plurality of third wires 1432 and the plurality of fourth wires 1442 may be in the form of loop coils.

In an embodiment, the plurality of first wires 1412 and/or the plurality of third wires 1432 may be directed in a first direction (e.g., the y-axis direction), and/or the plurality of second wires 1422 and/or the plurality of fourth wires 1442 may be directed in a second direction (e.g., the x-axis direction). Because the third digitizer layer 143 and the fourth digitizer layer 144 are added in addition to the first digitizer layer 141 and the second digitizer layer 142, accuracy of the digitizer 14 may be improved.

In an embodiment, as described above with reference to FIG. 4, the third digitizer layer 143 and/or the fourth digitizer layer 144 may also be manufactured by a laser-induced graphene process. Accordingly, the third layer 1431 may include a polyimide material, and/or a third wire 1432 may include a graphene material. In addition, the fourth layer 1441 may include a polyimide material, and/or a fourth wire 1442 may include a graphene material.

The embodiments described with reference to FIGS. 3A to 3C and FIGS. 5A to 5C are merely examples, and the number of digitizer layers is not limited thereto. The number of digitizer layers may be three, or five or greater.

Figure 6:
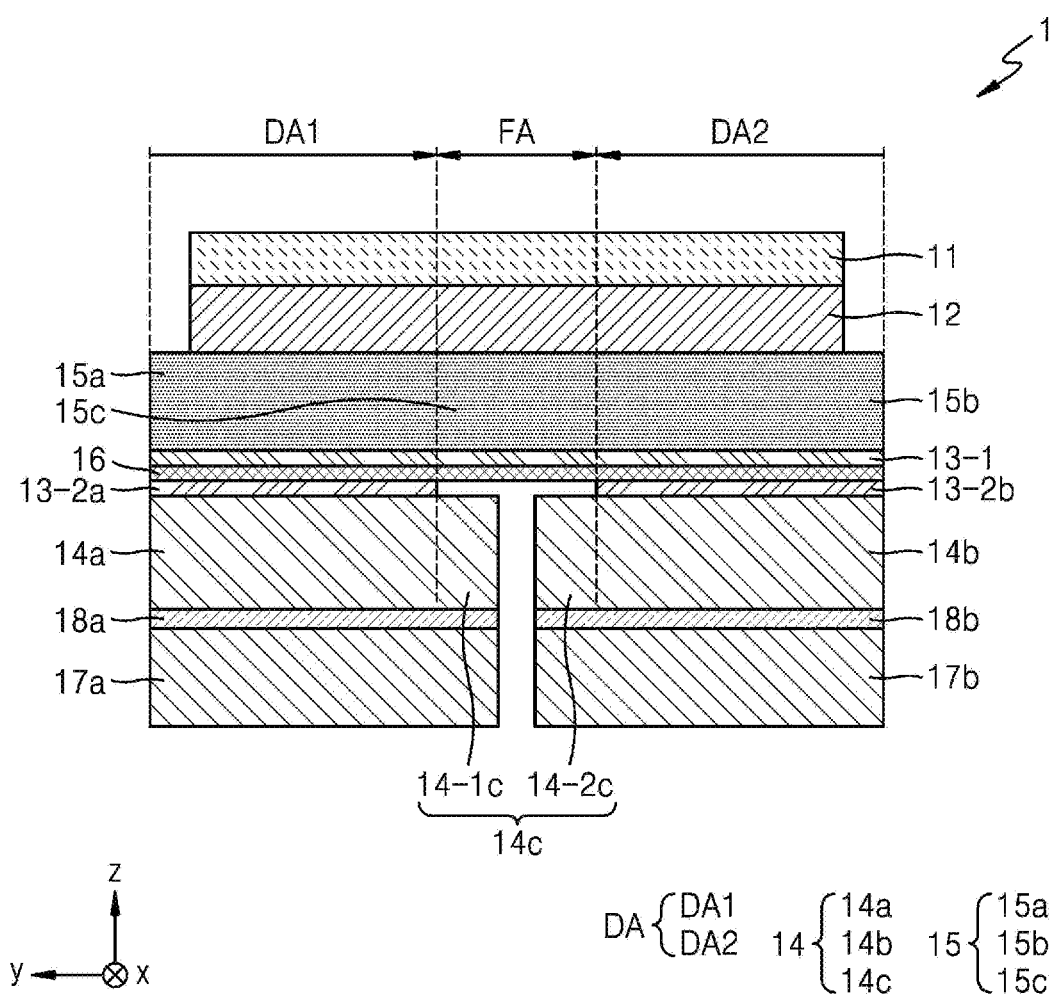
FIG. 6 is a cross-sectional view of a display device according to another embodiment.

FIG. 6 is a cross-sectional view of the display device 1 according to another embodiment. FIG. 6 may correspond to part II-II' of FIG. 1.

In FIG. 6, the same reference numerals as those in FIGS. 1 to 5C denote the same elements, and thus, a repeated description thereof is omitted below.

In an embodiment, the display device 1 may include the display panel 11, the panel protection member 12, the first plate 15, a first adhesive layer 1third-1, the elastic member 16, second adhesive layers 1third-2*a* and 1third-2*b*, the digitizer 14, electromagnetic wave absorption layers 18*a* and 18*b*, and/or the second plates 17*a* and 17*b*.

In an embodiment, the display panel 11 may be a light-emitting display panel including a light-emitting element. The panel protection member 12 may be disposed under the display panel 11.

In an embodiment, the first plate 15 may be disposed above the digitizer 14. The first plate 15 may include the first-1 plate portion 15*a* corresponding to the first display area DA1, the first-2 plate portion 15*b* corresponding to the second display area DA2, and the first-3 plate portion 15*c* corresponding to the foldable area FA.

In an embodiment, the first-1 plate portion 15*a*, the first-2 plate portion 15*b*, and/or the first-3 plate portion 15*c* may be integrally provided with one another.

In an embodiment, the first-1 plate portion 15*a* and/or the first-2 plate portion 15*b* may include the same material as each other. In addition, the first-3 plate portion 15*c* may include a material different from that of the first-1 plate portion 15*a* and/or the first-2 plate portion 15*b*. For example, the first-1 plate portion 15*a* and the first-2 plate portion 15*b* may include a non-metallic material. For example, the first-3 plate portion 15*c* may include a metal material. The first-3 plate portion 15*c* may include a folding structure.

In an embodiment, the elastic member 16 may be disposed under the first plate 15. The elastic member 16 may include a thermoplastic polyurethane (TPU) material.

In an embodiment, the first adhesive layer 13-1 may be disposed between the first plate 15 and the elastic member 16. For example, the first adhesive layer 13-1 may be pressure-sensitive adhesive (PSA).

In an embodiment, the digitizer 14 may be disposed below the display panel 11. That is, the first plate 15 may be disposed between the digitizer 14 and the display panel 11. The digitizer 14 may include the first digitizer portion 14*a* corresponding to the first display area DA1, the second digitizer portion 14*b* corresponding to the second display area DA2, and the third digitizer portion 14*c* corresponding to the foldable area FA.

In an embodiment, the third digitizer portion 14*c* may include a third-1 digitizer portion 14-1*c* and/or a third-2 digitizer portion 14-2*c*. The third-1 digitizer portion 14-1*c* may be integrally provided with the first digitizer portion 14*a*, and/or the third-2 digitizer portion 14-2*c* may be integrally provided with the second digitizer portion 14*b*. The third-1 digitizer portion 14-1*c* and the third-2 digitizer portion 14-2*c* may be located apart from each other in a first direction (e.g., the y-axis direction). In the structure described above, the digitizer 14 may have a separated structure in the foldable area FA. Accordingly, flexibility of the display device 1 may be improved.

In an embodiment, the second adhesive layers 13-2a and 13-2b may be disposed between the elastic member 16 and the digitizer 14. The second adhesive layers 13-2a and 13-2b may be located separate from each other with the foldable area FA therebetween. For example, the second adhesive layers 13-2a and/or 13-2b may be pressure-sensitive adhesive (PSA).

In an embodiment, the electromagnetic wave absorption layers 18a and/or 18b may be disposed under the digitizer 14. The electromagnetic wave absorption layers 18a and/or 18b may be arranged so as to correspond to the first digitizer portion 14a and/or the second digitizer portion 14b. The electromagnetic wave absorption layers 18a and/or 18b may include magnetic metal powder (MMP). As the electromagnetic wave absorption layers 18a and 18b include MMP, electromagnetic waves incident on the digitizer 14 or electromagnetic waves emitted from the digitizer 14 may be absorbed.

In an embodiment, the second plates 17a and 17b may be disposed under the electromagnetic wave absorption layers 18a and 18b. The second plates 17a and 17b may be located separate from each other around the foldable area FA. The second plates 17a and 17b may at least partially overlap the first display area DA1 and the second display area DA2. The second plates 17a and 17b may include a metal material.

Figure 7:
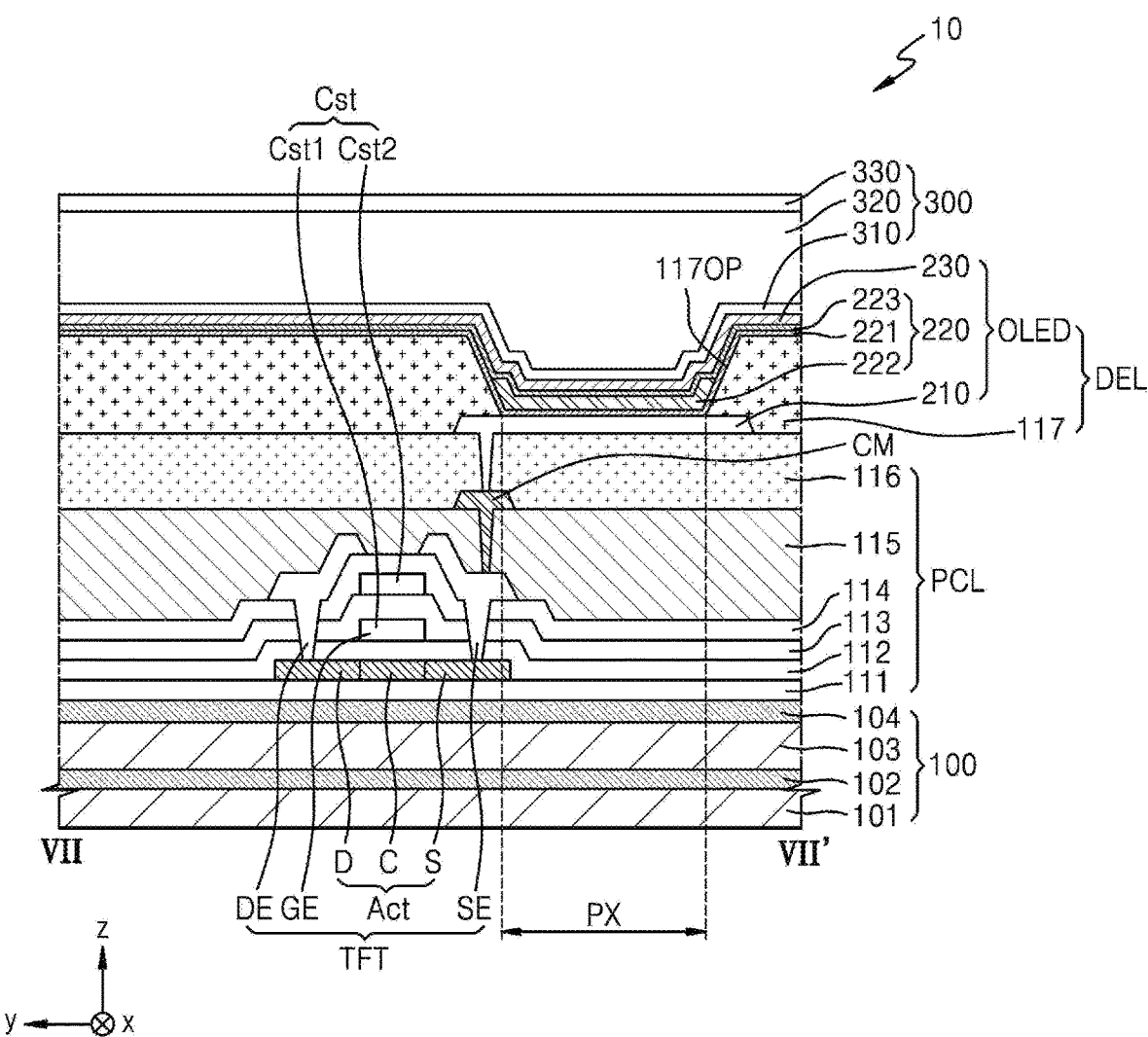
FIG. 7 is a schematic cross-sectional view of a display device according to an embodiment.

FIG. 7 is a schematic cross-sectional view of the display device 1 according to an embodiment, and may correspond to a cross-section of the display device 1, taken along line VII-VII' of FIG. 1.

In an embodiment and referring to FIG. 7, the display device 1 may include a stacked structure of a substrate 100, a pixel circuit layer PCL, a display element layer DEL, and an encapsulation layer 300.

In an embodiment, the substrate 100 may have a multi-layer structure including a base layer and/or an inorganic layer, the base layer including polymer resin. For example, the substrate 100 may include a base layer including polymer resin, and/or a barrier layer of an inorganic insulating layer. For example, the substrate 100 may include a first base layer 101, a first barrier layer 102, a second base layer 103, and a second barrier layer 104 that are sequentially stacked on one another. The first base layer 101 and/or the second base layer 103 may include polyimide (PI), polyethersulfone (PES), polyarylate, polyetherimide (PEI), polyethylene naphthalate (PEN), polyethylene terephthalate (PET), polyphenylene sulfide (PPS), polycarbonate, cellulose triacetate (TAC) and/or cellulose acetate propionate (CAP). The first barrier layer 102 and/or the second barrier layer 104 may include an inorganic insulating material, such as silicon oxide, silicon oxynitride and/or silicon nitride. The substrate 100 may be flexible.

In an embodiment, the pixel circuit layer PCL may be disposed on the substrate 100. FIG. 7 shows the pixel circuit layer PCL including a thin-film transistor TFT, and a buffer layer 111, a first gate insulating layer 112, a second gate insulating layer 113, an interlayer insulating layer 114, a first planarization insulating layer 115, and/or a second planarization insulating layer 116 disposed under and/or on elements of the thin-film transistor TFT.

In an embodiment, the buffer layer 111 may reduce or prevent penetration of foreign materials, moisture, and/or external air from below the substrate 100 and/or may provide a flat surface on the substrate 100. The buffer layer 111 may include an inorganic insulating material, such as silicon oxide, silicon oxynitride and/or silicon nitride, and/or may have a single-layer and/or multi-layer structure including the above-described material.

In an embodiment, the thin-film transistor TFT on the buffer layer 111 may include a semiconductor layer Act, and/or the semiconductor layer Act may include polysilicon (poly-Si). Alternatively, the semiconductor layer Act may include amorphous silicon (a-Si), an oxide semiconductor, and/or an organic semiconductor, etc. The semiconductor layer Act may include a channel region C, a drain region D and a source region S respectively arranged on both sides of the channel region C. A gate electrode GE may overlap the channel region C.

In an embodiment, the gate electrode GE may include a low-resistance metal material. The gate electrode GE may include a conductive material including molybdenum (Mo), aluminum (Al), copper (Cu), titanium (Ti), etc., and/or may have a multi-layer and/or single-layer structure including the above-described material.

In an embodiment, the first gate insulating layer 112 between the semiconductor layer Act and/or the gate electrode GE may include an inorganic insulating material, such as silicon oxide ($SiO_2$), silicon nitride ($SiN_X$), silicon oxynitride (SiON), aluminum oxide ($Al_2O_3$), titanium oxide ($TiO_2$), tantalum oxide ($Ta_2O_5$), hafnium oxide ($HfO_2$), and/or zinc oxide ($ZnO_X$). The zinc oxide ($ZnO_X$) may be zinc oxide (ZnO) and/or zinc peroxide ($ZnO_2$).

In an embodiment, the second gate insulating layer 113 may cover the gate electrode GE. Similarly to the first gate insulating layer 112, the second gate insulating layer 113 may include an inorganic insulating material, such as silicon oxide ($SiO_2$), silicon nitride ($SiN_X$), silicon oxynitride (SiON), aluminum oxide ($Al_2O_3$), titanium oxide ($TiO_2$), tantalum oxide ($Ta_2O_5$), hafnium oxide ($HfO_2$), and/or zinc oxide ($ZnO_X$). The zinc oxide ($ZnO_X$) may be zinc oxide (ZnO) and/or zinc peroxide ($ZnO_2$).

In an embodiment, a top electrode Cst2 of a storage capacitor Cst may be disposed on the second gate insulating layer 113. The top electrode Cst2 may overlap the gate electrode GE there-below. In this regard, the gate electrode GE and the top electrode Cst2 overlapping each other with the second gate insulating layer 113 therebetween may constitute the storage capacitor Cst. That is, the gate electrode GE may serve as a bottom electrode Cst1 of the storage capacitor Cst.

As described above, in an embodiment, the storage capacitor Cst and the thin-film transistor TFT may overlap each other. In some embodiments, the storage capacitor Cst may not overlap the thin-film transistor TFT.

In an embodiment, the top electrode Cst2 may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W) and/or copper (Cu), and/or may have a single-layer and/or multi-layer structure including the above-described material.

In an embodiment, the interlayer insulating layer 114 may cover the top electrode Cst2. The interlayer insulating layer 114 may include silicon oxide ($SiO_2$), silicon nitride ($SiN_X$), silicon oxynitride (SiON), aluminum oxide ($Al_2O_3$), titanium oxide ($TiO_2$), tantalum oxide ($Ta_2O_5$), hafnium oxide ($HfO_2$), and/or zinc oxide ($ZnO_X$). The zinc oxide ($ZnO_X$) may be zinc oxide (ZnO) and/or zinc peroxide ($ZnO_2$). The interlayer insulating layer 114 may have a single-layer and/or multi-layer structure including the above-described inorganic insulating material.

In an embodiment, a drain electrode DE and a source electrode SE may each be on the interlayer insulating layer 114. The drain electrode DE and/or the source electrode SE may be respectively connected to the drain region D and/or the source region S through contact holes formed in the insulating layers thereunder. The drain electrode DE and/or the source electrode SE may include a highly conductive material. The drain electrode DE and/or the source electrode SE may include a conductive material including molybdenum (Mo), aluminum (Al), copper (Cu), titanium (Ti), etc., and/or may have a multi-layer and/or single-layer structure including the above-described material. In an embodiment, the drain electrode DE and the source electrode SE may have a multi-layer structure of titanium (Ti)/aluminum (Al)/titanium (Ti).

In an embodiment, the first planarization insulating layer 115 may cover the drain electrode DE and/or the source electrode SE. The first planarization insulating layer 115 may include an organic insulating material, such as a general commercial polymer, polymethylmethacrylate (PMMA) and/or polystyrene (PS), a polymer derivative having a phenol-based group, an acryl-based polymer, an imide-based polymer, an aryl ether-based polymer, an amide-based polymer, a fluorine-based polymer, a p-xylene-based polymer, a vinyl alcohol-based polymer, and/or a blend thereof.

In an embodiment, the second planarization insulating layer 116 may be disposed on the first planarization insulating layer 115. The second planarization insulating layer 116 may include the same material as the first planarization insulating layer 115, and/or may include an organic insulating material, such as a general commercial polymer, such as PMMA or PS, a polymer derivative having a phenol-based group, an acryl-based polymer, an imide-based polymer, an aryl ether-based polymer, an amide-based polymer, a fluorine-based polymer, a p-xylene-based polymer, a vinyl alcohol-based polymer, and/or a combination thereof.

In an embodiment, the display element layer DEL may be disposed on the pixel circuit layer PCL having the above-described structure. The display element layer DEL may include an organic light-emitting diode OLED as a display element (that is, a light-emitting element), and/or the organic light-emitting diode OLED may include a stacked structure of a pixel electrode 210, an intermediate layer 220, and/or a common electrode 230. The organic light-emitting diode OLED, for example, may emit red, green, or blue light, or may emit red, green, blue, or white light. The organic light-emitting diode OLED may emit light through an emission area, and/or the emission area may be defined as a pixel PX.

In an embodiment, the pixel electrode 210 of the organic light-emitting diode OLED may be electrically connected to the thin-film transistor TFT through contact holes formed in the second planarization insulating layer 116 and/or the first planarization insulating layer 115 and/or a contact metal CM disposed on the first planarization insulating layer 115.

In an embodiment, the pixel electrode 210 may include conductive oxide, such as indium tin oxide (ITO), indium zinc oxide (IZO), zinc oxide (ZnO), indium oxide ($In_2O_3$), indium gallium oxide (IGO), and/or aluminum zinc oxide (AZO). In another embodiment, the pixel electrode 210 may include a reflective layer including silver (Ag), magnesium (Mg), aluminum (Al), platinum (Pt), palladium (Pd), gold (Au), nickel (Ni), neodymium (Nd), iridium (Ir), chromium (Cr), and/or a compound thereof. In another embodiment, the pixel electrode 210 may further include a layer formed of ITO, IZO, ZnO, and/or $In_2O_3$ on/under the above-described reflective layer.

In an embodiment, a bank layer 117 including an opening 117OP exposing a central portion of the pixel electrode 210 may be disposed on the pixel electrode 210. The bank layer 117 may include an organic insulating material and/or an inorganic insulating material. The opening 117OP may define an emission area of light emitted from the organic light-emitting diode OLED. For example, a size/width of the opening 117OP may correspond to a size/width of the emission area. Accordingly, a size and/or width of the pixel PX may depend on a size and/or width of the corresponding opening 117OP of the bank layer 117.

In an embodiment, the intermediate layer 220 may include an emission layer 222 corresponding to the pixel electrode 210. The emission layer 222 may include a polymer organic material or low-molecular weight organic material emitting light of a certain color. Alternatively, In an embodiment, the emission layer 222 may include an inorganic light-emitting material and/or quantum dots.

In an embodiment, the intermediate layer 220 may include a first functional layer 221 and/or a second functional layer 223 respectively disposed under and/or on the emission layer 222. The first functional layer 221 may include, for example, a hole transport layer (HTL), and/or an HTL and/or a hole injection layer (HIL). The second functional layer 223 may be an element disposed on the emission layer 222, and may include an electron transport layer (ETL) and/or an electron injection layer (EIL). Like the common electrode 230 described below, the first functional layer 221 and/or the second functional layer 223 may be a common layer covering a part of or the entire substrate 100.

In an embodiment, the common electrode 230 may be disposed above the pixel electrode 210 and/or may overlap the pixel electrode 210. The common electrode 230 may include a conductive material having a low work function. For example, the common electrode 230 may include a (semi)transparent layer including silver (Ag), magnesium (Mg), aluminum (Al), platinum (Pt), palladium (Pd), gold (Au), nickel (Ni), neodymium (Nd), iridium (Ir), chromium (Cr), lithium (Li), calcium (Ca), and/or an alloy thereof. Alternatively, In an embodiment, the common electrode 230 may further include a layer, such as ITO, IZO, ZnO, and/or $In_2O_3$, on a (semi)transparent layer including the above-described material. The common electrode 230 may be formed as one body covering the entire substrate 100.

In an embodiment, the encapsulation layer 300 may be disposed on the display element layer DEL and/or may cover the display element layer DEL. The encapsulation layer 300 may include at least one inorganic encapsulation layer and/or at least one organic encapsulation layer, and in an embodiment, FIG. 7 shows the encapsulation layer 300 including a first inorganic encapsulation layer 310, an organic encapsulation layer 320, and a second inorganic encapsulation layer 330 that are sequentially stacked on one another.

In an embodiment, the first inorganic encapsulation layer 310 and/or the second inorganic encapsulation layer 330 may include one or more inorganic materials among aluminum oxide, titanium oxide, tantalum oxide, hafnium oxide, zinc oxide, silicon oxide, silicon nitride, and/or silicon oxynitride. The organic encapsulation layer 320 may include a polymer-based material. Examples of the polymer-based material may include acryl-based resin, epoxy-based resin, polyimide, and/or polyethylene. In an embodiment, the organic encapsulation layer 320 may include acrylate. The organic encapsulation layer 320 may be formed by curing a monomer and/or applying a polymer. The organic encapsulation layer 320 may have transparency.

In an embodiment, although not shown, a touch sensor layer may be disposed on the encapsulation layer 300, and/or an optical functional layer may be disposed on the touch sensor layer. The touch sensor layer may obtain an external input, for example, coordinate information according to a touch event. The optical functional layer may reduce the reflectivity of light (e.g., external light) incident on the display device from the outside and/or may improve color purity of light emitted from the display device. In an embodiment, the optical functional layer may include a retarder and/or a polarizer. The retarder may be of a film type and/or a liquid crystal coating type and/or may include a λ/2 retarder and/or a λ/4 retarder. The polarizer may also be of a film type and/or a liquid crystal coating type. The film type may include a stretchable synthetic resin film, and the liquid crystal coating type may include liquid crystals arranged in a certain arrangement. The retarder and/or the polarizer may further include a protection film.

In an embodiment, an adhesive member may be disposed between the touch sensor layer and the optical functional layer. As the adhesive member, a general one known in the art may be employed without limitation. The adhesive member may be a pressure-sensitive adhesive (PSA).

Figure 8:
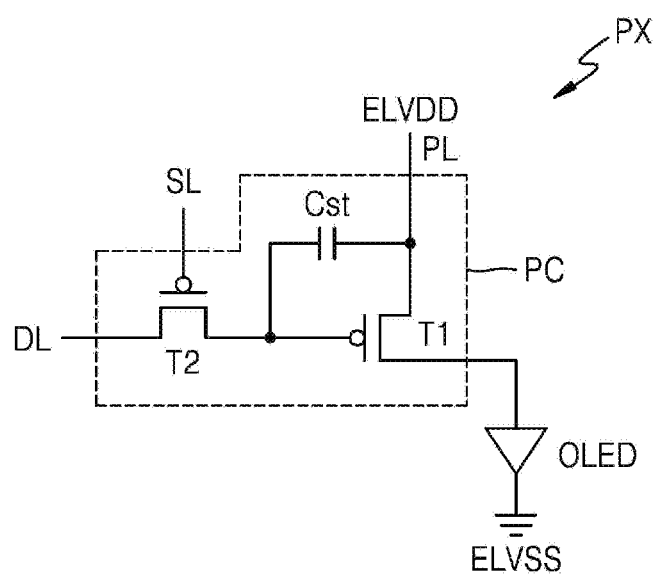
FIG. 8 is a schematic equivalent circuit diagram of a pixel in a display panel according to an embodiment.

FIG. 8 is an equivalent circuit diagram of one pixel PX in a display panel according to an embodiment.

In an embodiment, each pixel PX may include a pixel circuit PC and/or a display element connected to the pixel circuit PC, for example, the organic light-emitting diode OLED. The pixel circuit PC may include a first thin-film transistor T1, a second thin-film transistor T2, and/or the storage capacitor Cst. Each pixel PX may emit, for example, red, green, blue, and/or white light, through the organic light-emitting diode OLED.

In an embodiment, the second thin-film transistor T2, which may be a switching thin-film transistor, may be connected to a scan line SL and/or a data line DL and/or may be configured to transmit a data voltage input from the data line DL to the first thin-film transistor T1, based on a switching voltage input from the scan line SL. The storage capacitor Cst may be connected to the second thin-film transistor T2 and/or a driving voltage line PL and/or may store a voltage corresponding to a difference between a voltage received from the second thin-film transistor T2 and a first power voltage ELVDD supplied to the driving voltage line PL.

In an embodiment, the first thin-film transistor T1, which may be a driving thin-film transistor, may be connected to the driving voltage line PL and the storage capacitor Cst and/or may be configured to control a driving current flowing through the organic light-emitting diode OLED from the driving voltage line PL, in response to a voltage value stored in the storage capacitor Cst. The organic light-emitting diode OLED may emit light having certain brightness according to the driving current. An opposite electrode (e.g., a cathode) of the organic light-emitting diode OLED may receive a second power voltage ELVSS.

In an embodiment, although FIG. 8 shows the pixel circuit PC including two thin-film transistors and one storage capacitor, one or more embodiments are not limited thereto. The number of thin-film transistors and/or the number of storage capacitors may be variously modified according to the design of the pixel circuit PC. For example, the pixel circuit PC may further include four, five, or more thin-film transistors in addition to the two thin-film transistors described above.

According to one or more embodiments, a display device may have improved durability and may have reduced manufacturing cost.

Effects of one or more embodiments are not limited thereto, and other unmentioned effects will be apparent to one of ordinary skill in the art from the following claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims. The embodiments of the present disclosure disclosed in the present disclosure and illustrated in the drawings are provided as particular examples for more easily explaining the technical contents according to the present disclosure and helping understand the embodiments of the present disclosure, but not intended to limit the scope of the embodiments of the present disclosure. Accordingly, the scope of the various embodiments of the present disclosure should be interpreted to include, in addition to the embodiments disclosed herein, all alterations or modifications derived from the technical ideas of the various embodiments of the present disclosure. Moreover, the embodiments or parts of the embodiments may be combined in whole or in part without departing from the scope of the invention.

What is claimed is:

1. A display device comprising a display area and a foldable area, the display device comprising:
   a digitizer; and
   a display panel arranged on the digitizer,
   wherein the digitizer comprises:
      a first digitizer layer; and
      a second digitizer layer in contact with the first digitizer layer, and
   wherein the first digitizer layer comprises:
      a first layer comprising a polyimide material; and
         a plurality of first wires arranged on the first layer to be directed in a first direction and comprising a graphene material, and
   wherein the second digitizer layer comprises:
      a second layer comprising a polyimide material; and
         a plurality of second wires arranged on the second layer to be directed in a second direction crossing the first direction and comprising a graphene material.

2. The display device of claim 1, wherein the display area comprises a first display area and a second display area spaced apart from each other with the foldable area therebetween,
   wherein the digitizer comprises:
      a first digitizer portion corresponding to the first display area;
      a second digitizer portion corresponding to the second display area; and
      a third digitizer portion corresponding to the foldable area.

3. The display device of claim 2, wherein the first digitizer portion, the second digitizer portion, and the third digitizer portion are integrally provided with one another.

4. The display device of claim 3, further comprising a first plate arranged under the digitizer.

5. The display device of claim 4, wherein the first plate comprises a metal material.

6. The display device of claim 2, wherein the third digitizer portion comprises:

a third-1 digitizer portion integrally provided with the first digitizer portion; and a third-2 digitizer portion located apart from the third-1 digitizer portion and integrally provided with the second digitizer portion.

7. The display device of claim 6, further comprising a first plate arranged between the digitizer and the display panel.

8. The display device of claim 7, wherein the first plate comprises:

a first-1 plate portion corresponding to the first display area and comprising a non-metallic material;

a first-2 plate portion corresponding to the second display area and comprising a non-metallic material; and a first-3 plate portion corresponding to the foldable area and comprising a metal material.

9. The display device of claim 1, wherein the digitizer further comprises a third digitizer layer in contact with the second digitizer layer, and wherein the third digitizer layer comprises:

a third layer comprising a polyimide material; and a plurality of third wires arranged on the third layer to be directed in the first direction and comprising a graphene material.

10. The display device of claim 9, wherein the digitizer further comprises a fourth digitizer layer in contact with the third digitizer layer, and wherein the fourth digitizer layer comprises:

a fourth layer comprising a polyimide material; and a plurality of fourth wires arranged on the fourth layer to be directed in the second direction and comprising a graphene material.

11. A method of manufacturing a display device comprising a display area and a foldable area, the method comprising:

arranging a digitizer; and arranging a display panel on the digitizer, wherein the arranging of the digitizer comprises:

arranging a first digitizer layer; and arranging a second digitizer layer on the first digitizer layer to be in contact with the first digitizer layer, and wherein the arranging of the first digitizer layer comprises forming a plurality of first wires to directed in a first direction and comprising a graphene material by emitting a laser beam onto a first layer comprising a polyimide material, and the arranging of the second digitizer layer comprises forming a plurality of second wires to be directed in a second direction crossing the first direction and comprising a graphene material by emitting a laser beam onto a second layer comprising a polyimide material.

12. The method of claim 11, wherein the display area comprises a first display area and a second display area apart from each other with the foldable area therebetween, and wherein the digitizer comprises:

a first digitizer portion corresponding to the first display area;

a second digitizer portion corresponding to the second display area; and a third digitizer portion corresponding to the foldable area.

13. The method of claim 12, wherein the first digitizer portion, the second digitizer portion, and the third digitizer portion are integrally provided with one another.

14. The method of claim 13, further comprising arranging a first plate under the digitizer.

15. The method of claim 14, wherein the first plate comprises a metal material.

16. The method of claim 12, wherein the third digitizer portion comprises:

a third-1 digitizer portion integrally provided with the first digitizer portion; and a third-2 digitizer portion spaced apart from the third-1 digitizer portion and integrally provided with the second digitizer portion.

17. The method of claim 16, further comprising arranging a first plate between the digitizer and the display panel.

18. The method of claim 17, wherein the first plate comprises:

a first-1 plate portion corresponding to the first display area and comprising a non-metallic material;

a first-2 plate portion corresponding to the second display area and comprising a non-metallic material; and a first-3 plate portion corresponding to the foldable area and comprising a metal material.

19. The method of claim 11, wherein the arranging of the digitizer further comprises arranging a third digitizer layer on the second digitizer layer to be in contact with the second digitizer layer, and wherein the arranging of the third digitizer layer comprises forming a plurality of third wires to be directed in the first direction and comprising a graphene material by emitting a laser beam onto a third layer comprising a polyimide material.

20. The method of claim 19, wherein the arranging of the digitizer further comprises arranging a fourth digitizer layer on the third digitizer layer to be in contact with the third digitizer layer, and wherein the arranging of the fourth digitizer layer comprises forming a plurality of fourth wires to be directed in the second direction and comprising a graphene material by emitting a laser beam onto a fourth layer comprising a polyimide material.

* * * * *